(12) United States Patent
Sun et al.

(10) Patent No.: US 10,340,824 B2
(45) Date of Patent: Jul. 2, 2019

(54) MOTOR DRIVEN INTEGRATED CIRCUIT, MOTOR DEVICE, AND APPLICATION APPARATUS

(71) Applicant: JOHNSON ELECTRIC INTERNATIONAL AG, Murten (CH)

(72) Inventors: Chiping Sun, Hong Kong (CN); Qiubao Wang, Shenzhen (CN); Ken Wong, Hong Kong (CN); Enhui Wang, Shenzhen (CN); Haibo Jiang, Shenzhen (CN); Shujuan Huang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/803,229

(22) Filed: Nov. 3, 2017

(65) Prior Publication Data

US 2018/0131300 A1    May 10, 2018

(30) Foreign Application Priority Data

Nov. 4, 2016  (CN) .......................... 2016 1 0978251
Oct. 27, 2017  (CN) .......................... 2017 1 1025996

(51) Int. Cl.
*H02P 6/17*    (2016.01)
*H02P 6/06*    (2006.01)
(Continued)

(52) U.S. Cl.
CPC ................ *H02P 6/17* (2016.02); *F04D 13/06* (2013.01); *G01D 5/145* (2013.01); *G11B 21/08* (2013.01);
(Continued)

(58) Field of Classification Search
CPC .. H02P 6/17; H02P 6/182; H02P 27/08; H02P 6/15; H02P 23/14; H02P 27/06;
(Continued)

(56) References Cited

U.S. PATENT DOCUMENTS 4,316,132 A * 2/1982 Geppert .............. B60L 11/1803
                                                    318/721
4,371,824 A * 2/1983 Gritter ................ B60L 11/1803
                                                    318/681
(Continued)

FOREIGN PATENT DOCUMENTS

GB        2507401 A  *  4/2014    ................ H02P 6/16
GB        2507401 A     4/2014
WO   WO2011/109435 A2    9/2011

*Primary Examiner* — Thai T Dinh
(74) *Attorney, Agent, or Firm* — Muncy, Geissler, Olds & Lowe, P.C.

(57) ABSTRACT

A motor-driven integrated circuit comprises a plurality of position comparators, a timer and a central processing. Each of the plurality of position comparators receives a pole detection signal denoted a position of a rotor of a motor. The timer receives a timing interrupt signal output by the plurality of position comparators when a predetermined edge of the pole detection signal is generated and records a time of the predetermined edge. The central processing unit obtains a rotation speed of the motor according to a time difference between two predetermined edges.

20 Claims, 4 Drawing Sheets

(51) Int. Cl.
*F04D 13/06* (2006.01)
*G01D 5/14* (2006.01)
*G11B 21/08* (2006.01)
*H02K 11/04* (2016.01)
*H02P 1/22* (2006.01)
*H02P 6/22* (2006.01)
*H02P 23/00* (2016.01)

(52) U.S. Cl.
CPC .............. *H02K 11/044* (2013.01); *H02P 1/22* (2013.01); *H02P 6/06* (2013.01); *H02P 6/22* (2013.01); *H02P 23/0004* (2013.01)

(58) Field of Classification Search
CPC .. H02P 29/027; H02P 6/06; H02P 6/16; H02P 6/22; F04D 13/06; G01D 5/145; G11B 21/08; G11B 27/002; H02K 11/044
See application file for complete search history.

(56) References Cited

U.S. PATENT DOCUMENTS

| | | | |
|---|---|---|---|
| 6,194,856 B1* | 2/2001 | Kobayashi | H02M 7/003 318/432 |
| 6,683,799 B2* | 1/2004 | Kato | H02H 7/1225 363/132 |
| 2008/0048598 A1* | 2/2008 | Shibuya | H02P 6/185 318/400.1 |
| 2010/0315029 A1 | 12/2010 | Kern et al. | |
| 2011/0084640 A1 | 4/2011 | Brown | |
| 2012/0153719 A1* | 6/2012 | Inaba | B60L 3/003 307/10.1 |
| 2015/0303839 A1 | 10/2015 | Ueno et al. | |
| 2016/0094168 A1 | 3/2016 | Maekawa et al. | |
| 2016/0380529 A1* | 12/2016 | Courtel | H02M 1/4225 323/205 |
| 2017/0059416 A1* | 3/2017 | Fujisaki | G01K 3/04 |

\* cited by examiner

MOTOR DRIVEN INTEGRATED CIRCUIT, MOTOR DEVICE, AND APPLICATION APPARATUS

CROSS REFERENCE TO RELATED APPLICATIONS

This non-provisional patent application claims priority under 35 U.S.C. § 119(a) from Patent Application No. 201610978251.6 filed in the People's Republic of China on Nov. 4, 2016 and Patent Application No. 201711025996.1 filed in the People's Republic of China on Oct. 27, 2017.

FIELD OF THE INVENTION

This disclosure relates to a field of circuit technology. In particular, the present disclosure relates to a motor driver integrated circuit for driving a motor, a motor device and an application apparatus using same.

BACKGROUND OF THE INVENTION

Motor is an electromagnetic device which is based on electromagnetic induction law to achieve energy conversion, now the motor is widely used in household appliances, power tools, medical equipment and light industrial equipment. To achieve a high-performance motor control, a motor speed is needed to detect.

SUMMARY OF THE INVENTION

A motor driver integrated circuit comprises a plurality of position comparators, a timer and a central processing. Each of the plurality of position comparators receives a pole detection signal denoted a position of a rotor of a motor. The timer receives a timing interrupt signal output by the plurality of position comparators when a predetermined edge of the pole detection signal is generated and records a time of the predetermined edge. The central processing unit obtains a rotation speed of the motor according to a time difference between two predetermined edges.

Preferably, the motor driver integrated circuit further comprises a logic selection circuit coupled between the plurality of position comparators and the timer, wherein the logic selection circuit selects two adjacent edges of the pole detection signal according to a setting of the central processing unit and controls the timer to time.

Preferably, the logic selection circuit selects two adjacent edges of one pole detection signal, two adjacent rising edges of one pole detection signal, two adjacent falling edges of the one pole detection signal, the two adjacent edges of two pole detection signals, the two adjacent rising edges of two pole detection signals, or the two adjacent falling edge of two pole detection signals according to the setting of the central processing unit.

Preferably, the motor driver integrated circuit comprises at least two position comparators, the central processing unit obtaining the rotation speed according to at least two pole detection signals.

Preferably, the pole detection signal is obtained by a Hall sensor or by a back-EMF zero-crossing detection method.

Preferably, when one of the plurality of position comparators receives the predetermined edge and outputs the timing interrupt signal to the timer, the timer records a first time; when a next predetermined edge is generated, the timer receives the timing interrupt signal and records a second time; and the central processing unit obtains the rotation speed of the motor via a time difference between the first time and the second time.

Preferably, the first time is a time when the predetermined edge is generated for a first pole detection signal, and the second time is a time when the predetermined edge is generated for a second pole detection signal.

Preferably, after the second time is recorded, the timer clears the first time and records the second time as the first time, when a next predetermined edge is generated, a second time is recorded.

Preferably, the motor driver integrated circuit further comprises a PWM output unit; an overcurrent comparator receiving a detection signal and comparing the detection signal with a reference value; wherein when the detection signal is larger than the reference value, the PWM output unit is entered to an overcurrent protection mode under control an overcurrent protection signal output by the overcurrent comparator.

Preferably, the motor driver integrated circuit further comprises a first filter coupled between the PWM output unit and the overcurrent comparator.

Preferably, the overcurrent comparator directly outputs the overcurrent protection signal to the PWM output unit and controls the PWM output unit to enter the overcurrent protection mode.

Preferably, the overcurrent comparator outputs the overcurrent protection signal to the central processing unit and the central processing unit controls the PWM output unit to enter the overcurrent protection mode.

Preferably, the motor driver integrated circuit further comprises an interrupt controller, and the overcurrent comparator outputs the overcurrent protection signal to the interrupt controller, the interrupt controller outputs an interrupt signal to the central processing unit, and the central processing unit controls the PWM output unit enter the overcurrent protection mode.

Preferably, when the PWM output unit is entered into the overcurrent protection mode, the PWM output unit performs one of following operations: stopping outputting drive signal; reducing a duty of the drive signal; and stopping outputting the drive signal and resetting to output the drive signal after a preset time delay.

Preferably, the motor driver integrated circuit further comprises a plurality of operation amplifiers, each operation amplifier receives a current flowing through a winding, the central processing unit obtains a rotation speed according to the current.

Preferably, the motor driver integrated circuit further comprises a shifter connected to the central processing unit via a bus.

A motor device comprises a motor and the motor driver integrated circuit as described-above.

An application apparatus comprises a motor device as described-above.

Preferably, the application apparatus is one of a pump, a fan, a household appliance, and a vehicle.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Hereinafter, particular embodiments of the present disclosure are described in detail in conjunction with the drawings, so that technical solutions and other beneficial effects of the present disclosure are apparent. It can be understood that the drawings are provided only for reference and explanation, and are not used to limit the present disclosure. Dimensions shown in the drawings are only for ease of clear description, but are not limited to a proportional relationship.

Figure 1:
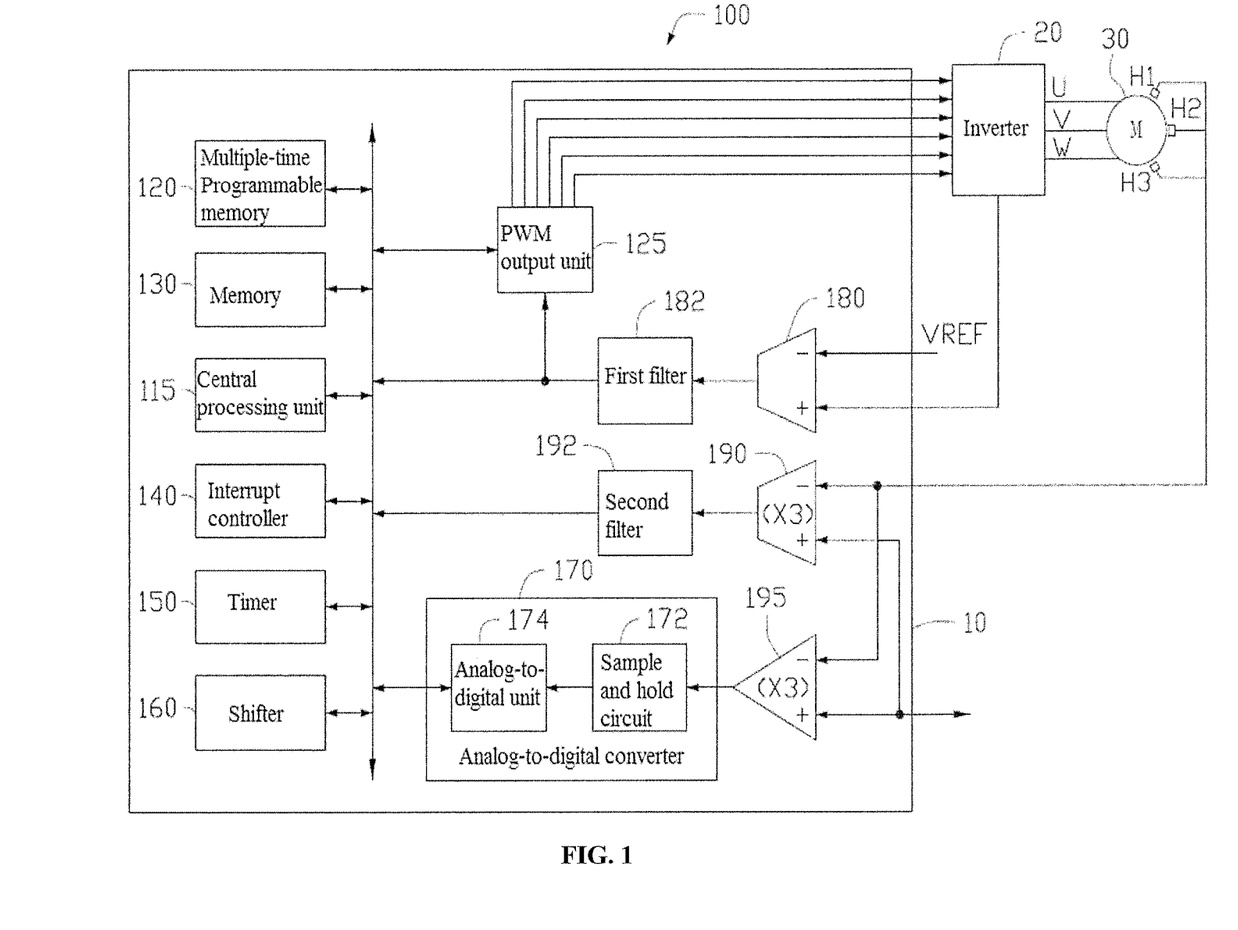
FIG. 1 shows a block diagram of a motor device according to one embodiment of the present disclosure.

FIG. 1 shows a motor device 100 according to one embodiment. The motor device 100 can include a motor 30, a motor driver integrated circuit 10, and an inverter 20. In the embodiment, the motor 30 can be a brushless direct current motor (BLDC), or a permanent magnet synchronous motor (PMSM). The motor 30 can include a stator and a rotor rotatably received in the stator. The stator can comprise a stator core and a stator winding wound around on the stator core. The stator core can be made of soft magnetic materials such as pure iron, cast iron, cast steel, electrical steel, silicon steel. The rotor can include a plurality of permanent magnet.

Figure 2:
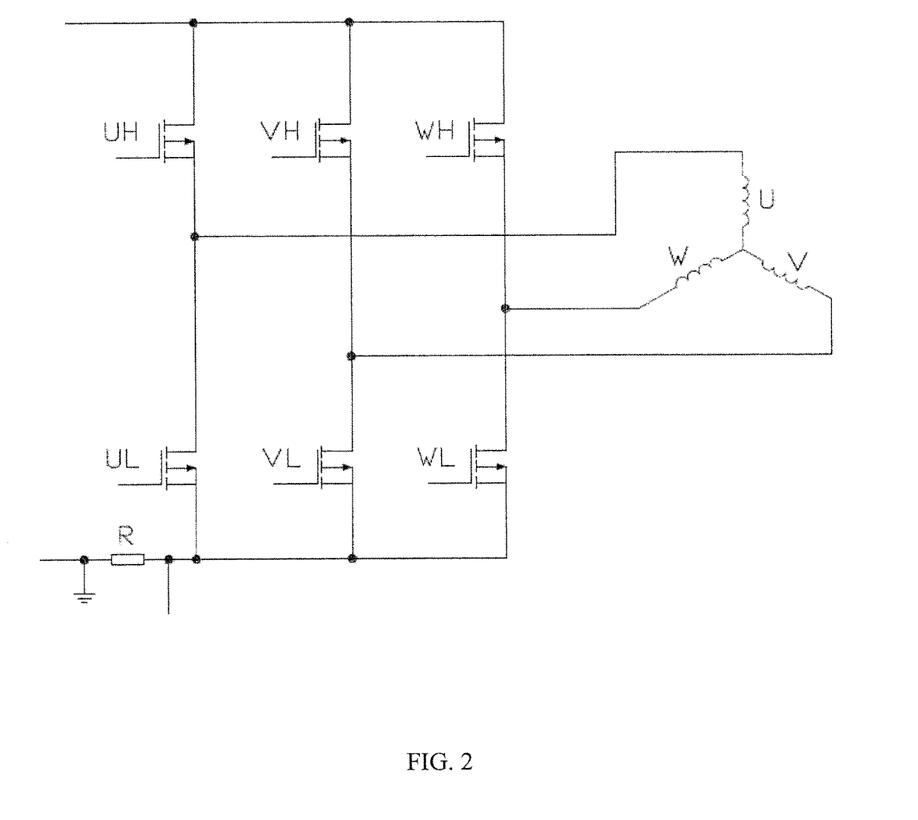
FIG. 2 shows a circuit diagram of an inverter and a motor winding of FIG. 1.

As shown in FIG. 2, in the embodiment, the motor 30 can be a three phase BLDC. The stator core can include three phases labeled as, U, V, and W. One end of the three phases U, V, and W is electrically coupled to the inverter 20, and the other end of the three phases U, V, and W is electrically coupled to a neutral point. In the embodiment, the stator winding is connected in Y-shaped. In another embodiment, the stator winding can be connected in triangular shaped.

In the embodiment, the inverter 20 can be a three-phase bridge inverter. The inverter 20 can include six semiconductor switches. The U phase winding is electrically coupled with a node between an upper side switch UH and a lower side switch UL. The V phase winding is electrically coupled with a node between an upper side switch VH and a lower side switch VL. The W phase winding is electrically coupled with a node between an upper side switch WH and a lower side switch WL. The motor driver integrated circuit 10 outputs a drive signal, such as, a PWM signal, to the inverter 20. Each switch is controlled by the control signal to switch on and switch off. The two switches in each bridge are interlocked, that is only one switch can be turned on in each bridge. In the embodiment, each switch can be a MOSFET. In another embodiment, each switch can be selected from insulated gatebipolar transistor (IGBT), or BJT.

In another embodiment, the motor 30 can be a single phase, two phase or multiple phase BLDC.

The motor 30 can further include a position sensor to sense a position of the rotor. In the embodiment, the motor 30 can include three Hall sensors, which are labeled as H1, H2, and H3, respectively. The three Hall sensors H1, H2 and H3 are arranged at an electrical angle of 120 degrees in the circumferential direction of the rotor. In another embodiment, the three Hall sensors H1, H2, H3 may be arranged in turn along the circumferential direction of the rotor at other electrical angles, such as 60 degrees. The Hall sensors H1, H2 and H3 output logic high or low level pole detection signals according to a direction of magnetic fluxes through the Hall sensors H1, H2 and H3, and each edge of the pole detection signal indicates a change of a polarity of the rotor.

The motor driver integrated circuit 10 can include a housing, a semiconductor substrate arranged in the housing, a plurality of input and output (I/O) interfaces extending from the housing. The motor driver integrated circuit 10 can include a central processing unit (CPU) 115, a memory 130, a Multiple-Time Programmable (MTP) memory 120, a timer 150, a shifter 160, a PWM output unit 125, an overcurrent comparator 180, a plurality of position comparators 190, a plurality of operation amplifiers 195, a first filter 182, a second filter 192, and an Analog-to-Digital Converter (ADC) 170. The PWM output unit 125, the overcurrent comparator 180, the plurality of position comparators 190, the plurality of amplifiers 195 and the ADC 170 are electrically coupled to the I/O interfaces. In the embodiment, the CPU 115 can be a 8-bit Single Chip Micyoco (SCM), an operating frequency of the SCM can be 80 MHz.

The CPU 115 is electrically coupled to the memory 130, the MTP memory 120, the shifter 160, the timer 150, the PWM output unit 125, the first filter 182, the second filter 192, and the ADC 170 via a bus.

The CPU 115 is a central control center of the motor device 100. The memory 130 can temporarily store operation data of the CPU 115. The MTP memory 120 can store a configuration data of the motor device 100 and a plurality of driven programs of the motor device 100.

The motor driver integrated circuit 10 can include three position comparators 190. Each position comparator can receives a pole detection signal which denotes a position of the rotor. Each position comparator can compare the pole detection signal with a reference value and output a comparison result signal. Output ends of the three position comparators 190 are electrically coupled to the CPU 115 via the second filter 192. The rotor pole position is obtained by the CPU 115 according to the pole detection signals output by the three Hall sensors. In the embodiment, the pole detection signals are denoted as 011, 001, 101, 100, 110, and 010 between a 360 degrees electrical cycle. The CPU 115 controls the PWM output unit 125 output the drive signal to drive the motor 30. When the three pole detection signals are 011, the CPU 115 controls the PWM output unit 125 output the drive signal to turn on the upper side switch UH and the lower side switch WL. In the embodiment, the pled detection signals are square wave.

In another embodiment, the position sensors can be omitted. The CPU can obtain the rotor position via a sensorless method. When the motor 30 rotates, a back electromotive force is generated in the stator winding. The rotor position can be obtained by detecting a zero crossing of the back electromotive force with the position comparators 190.

The plurality of operation amplifiers 195 can be used in Field Oriented Control (FOC) of PMSM. In the embodiment, the plurality of operation amplifiers 195 simultaneously collect currents of the two-phase windings in the three-phase windings and then amplifies them to the analog-to-digital converter 170, and calculates the other phase according to the result of the conversion. And the central processing unit 115 obtains a rotation speed of the motor by Park positive and negative transformation based on the currents of each phase winding. In the embodiment, the current acquired by the operation amplifier 195 is a sine wave, and it is understood that the current acquired by the operation amplifier 195 may be other waveforms.

Output ends of the plurality of operation amplifiers 195 are electrically coupled to the analog-to-digital converter 170. The analog-to-digital converter 170 can include a sample and hold circuit 172 and an analog-to-digital unit 174. The analog-to-digital unit 174 can convert an analog signal output by the operation amplifier 195 to a digital signal. The sample and hold 172 is configured to ensure an accuracy of the analog-to-digital unit 174.

The PWM output unit 125 can include a plurality of output ends. In the embodiment the PWM output unit 125 can include six output ends. Each output end is electrically coupled to one semiconductor switch of the inverter 20. The PWM output unit 125 is controlled by the CPU 115 to output drive signals to turn on and off the semiconductor switch of the inverter 20.

One input end of the overcurrent comparator 180 receives a detection signal which denotes an operation current of the motor 30, the other input end of the overcurrent comparator 180 receives a reference value VREF. An output end of the overcurrent comparator 180 is electrically coupled to the PWM output unit 125 and the CPU 115 via the first filter 182.

An 8-bit microcontroller is usually operated in a low frequency, such as 20-50 MHz. The 8-bit microcontroller with low frequency cannot meet the real-time requirements for the motor control, and the real-time motor drive chip is usually used at least 16-bit microcontroller with a higher cost. In the embodiment, the motor driver integrated circuit is fabricated using a 0.15 μm semiconductor process with a higher operating frequency (e.g., 80 MHz), which can improve the processing speed and meet the real-time requirements for motor control. On the other hand, the 8-bit microcontroller can significantly reduce cost, and 0.15 μm process can reduce a size of bare die to 8~9 mm². In contrast, if the 0.25 μm process, the operating frequency is less than 50 MHz, the 0.35 μm process, the clock frequency is 20~30 MHz, and die area will increase proportionally.

When the motor device 100 is powered or reset, the CPU 115 firstly performs a boot loader program, and copy all program codes from the Multiple-Time Programmable memory 120 to the memory 130. The Multiple-Time Programmable memory 120 stores motor configuration data and motor driver programs. In the embodiment, he configuration data and the motor driver programs can be stored in the Multiple-Time Programmable memory 120. Compared with Flash memory, in particular to large-scale manufacturing, the Multiple-Time Programmable memory 120 can reduce cost. In the embodiment, a capacity of the Multiple-Time Programmable memory 120 is 32 KB. In another embodiment, the capacity of the Multiple-Time Programmable Memory 120 can be 48 KB, 64 KB. A capacity of the memory 130 is 48 KB, the capacity of the memory 130 is larger than the capacity of the Multiple-Time Programmable memory 120. In the embodiment, the memory 130 can be a random access memory (RAM). As the memory 130 has a higher operating frequency than the Multiple-Time Programmable memory 120, all program codes in the MTP 130 are copied to the memory, the motor driver integrated circuit 10 accelerates operating frequency with a low cost.

Figure 3:
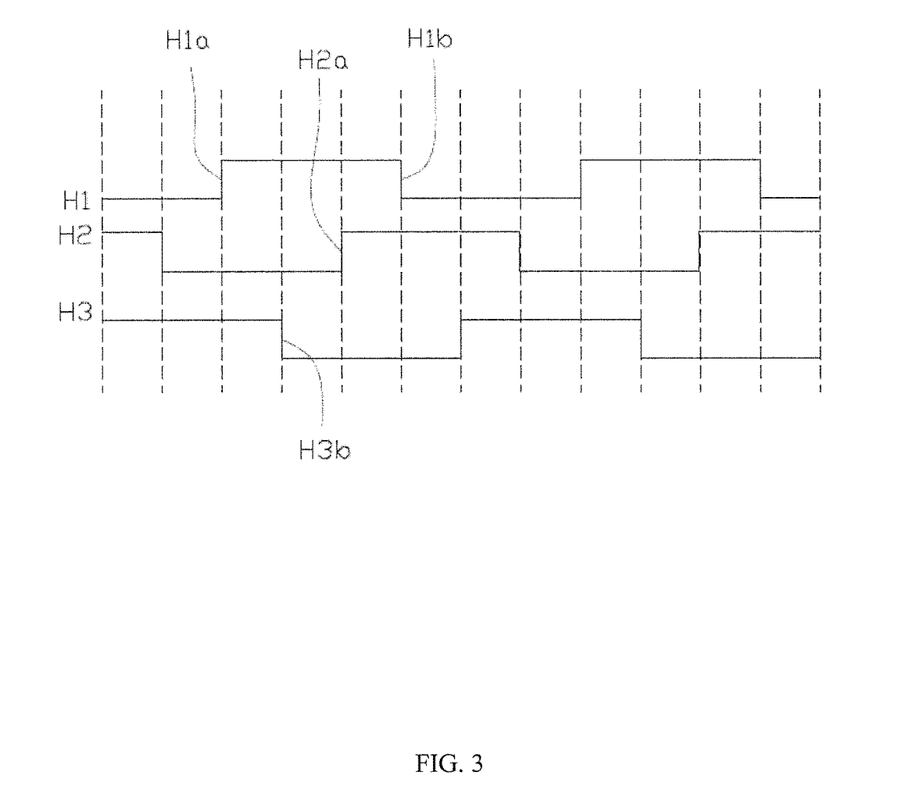
FIG. 3 shows a waveform of a Hall sensor of FIG. 1.

The Hall sensors H1, H2, and H3 output three pole detection signals to the three position comparators 190, respectively. As shown in FIG. 3, the three pole detection signals are mutually different with 120 degree electrical angle. When the position comparator 190 obtains a level transition of the pole detection signal, that is a rising edge or a falling edge, the position comparator 190 outputs a timing interrupt signal to the timer 150.

A first position comparator obtains a rising edge H1a, and the first position comparator outputs a timing interrupt signal to the timer 150 and the timer 150 records a time t0. When a next edge is generated, such as a falling edge H3b, the third position comparator outputs a timing interrupt signal to the timer 150 and the timer 150 records a time t1. The CPU 115 obtains a rotation speed of the motor 30 via a time difference Δt between t0 and t1.

After the time t1 is recorded, the timer 150 clears the time t0 and records time t1 as time t0. When a next edge is generated, such a rising edge H2a, the second comparator outputs a timing interrupt signal to the timer 150. The CPU 115 obtains a rotation speed of the motor via a time difference Δt between t0 and t1. And then the rotation speed of the motor is obtained by calculating the time difference between the rising edge H2a and the falling edge H1b as follows. In the motor running stage, the CPU 115 determines the operating condition of the motor by calculating the rotational speed of the motor by the time difference of every two adjacent edges.

Figure 4:
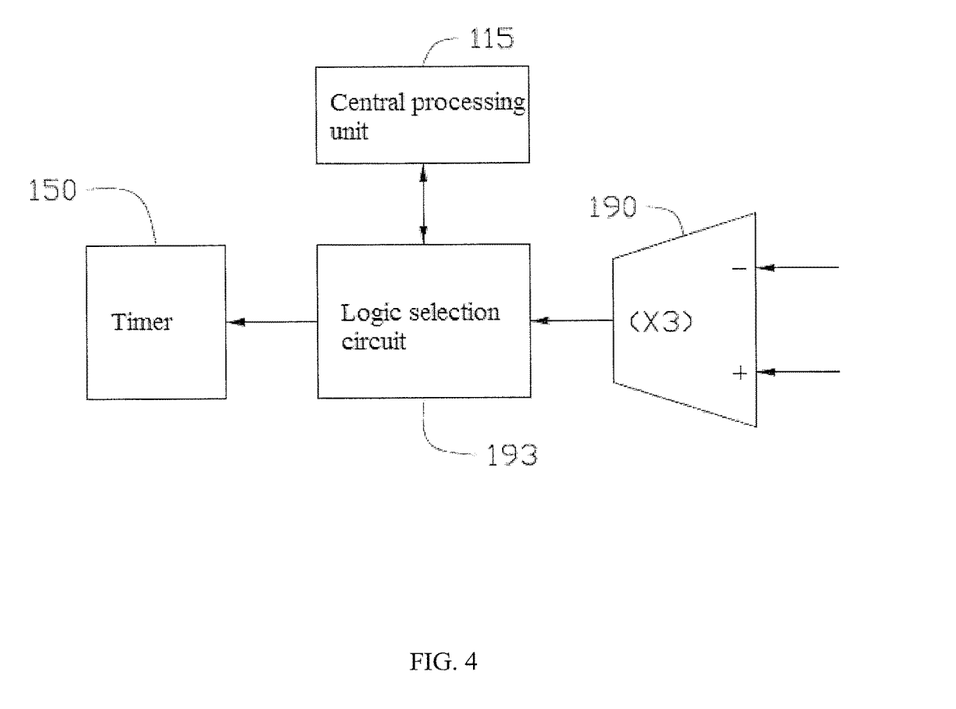
FIG. 4 shows a block diagram of a CPU of a motor driver integrated circuit is coupled to a timer via a logic selection circuit according to one embodiment.

In the embodiment, it is possible to detect not only the time difference of adjacent edges but also the time difference at which the adjacent edge or adjacent rising and falling edges of the Hall signal can be detected as necessary. As shown in FIG. 4, in another embodiment, the position comparator 190 are electrically connected to a logic selection circuit 193 which is coupled to the central processing unit 115 and the timer 150. The logic selection circuit 193 selects two adjacent edges of one Hall signal, the two adjacent rising edges of one Hall signal, the two adjacent falling edges of the one Hall signal, the two adjacent edges of two Hall signals, the two adjacent rising edges of two Hall signals, or the two adjacent falling edge of two Hall signals according to a setting of the central processing unit 115. The timer 150 is controlled to time according to the two edges selected by the logic selection circuit 193.

Each position comparator is needed to connect an interrupt controller. In the embodiment, the position comparators 190 are directly coupled to the timer 150 or coupled to the timer 150 via the logic selection circuit 193. The interrupt controller can be omitted. And the timer 150 counts in response to the edge of each Hall signal, a sampling frequency is fast. It is obvious that a faster sampling, a better dynamic response can be obtained. The motor can operate more smoothly and reduce a speed fluctuation. The logic selection circuit is provided in the motor driver integrated circuit 10, it is possible to select the different edges to calculate the rotation speed of the motor so that the motor driver integrated circuit 10 can be adapted to different motor devices to improve the versatility of the motor.

The motor driver integrated circuit 10 can further include a shifter 160. In the embodiment, the shifter 160 can be a barrel shifter. The shifter 160 can perform a shift operation bits in a plurality of ways such as multiplication and division in a single cycle. For example, if all the operations are performed by the CPU 115, the operation of the system will be slowed down, and the operation such as multiplication and division is performed by the shifter 160, and the shift operation becomes faster, And the shift operation is not performed by the CPU 115, the CPU 115 can be released for performing other operation, and an efficiency of the entire motor driver integrated circuit 10 can be increased.

During the operation of the motor, the overcurrent comparator 180 receives a detection signal indicative of the operating current of the motor. In the embodiment, a sampling resistor R is coupled the inverter 20 and a ground. The operating current of the motor is converted into a sampling voltage by the sampling resistor R. The overcurrent comparator 180 receives the sampling voltage and compares the sampling voltage with the reference value VREF. When the sampling voltage is larger than the reference value VREF, the overcurrent is generated in the motor, and the overcurrent comparator 180 outputs an overcurrent protection signal to the PWM output unit 125. The PWM output unit 125 can enter an overcurrent protection mode according to the overcurrent protection signal. In this way, the overcurrent comparator 180 directly controls the PWM output unit 125 to enter the overcurrent protection mode when the overcurrent is generated in the motor, and the PWM output unit 125 responds quickly to the overcurrent of the motor and can protect the motor quickly and efficiently. In another embodiment, the overcurrent comparator 180 outputs the overcurrent protection signal to the central processing unit 115, and then the central processing unit 115 controls the PWM output unit 125 to enter the overcurrent protection mode.

When the PWM output unit 125 enters the overcurrent protection mode, the PWM output unit 125 may perform one of the following operations, for example, to stop outputting the drive signal to the inverter 20, to reduce a duty of the drive signal output to the inverter 20, to stop outputting the drive signal to the inverter 20 and reset to output the drive signal after a preset time delay. The specific operation in the overcurrent protection mode can be performed according to the design requirements or the environment of the motor application.

The first filter 182 is coupled between the overcurrent comparator 180, the PWM output unit 125 and the central processor 115. The first filter 182 may be configured to sample the overcurrent protection signal in a predetermined manner. The predetermined manner can be that the first filter 182 samples the overcurrent protection signal for a predetermined number of times in a predetermined cycle, the first filter 182 samples the overcurrent protection signal in two cycles. The first filter 182 determines whether the overcurrent is generated according to sample values. The first filter 182 is configured to eliminate a glitch signal. The second filter 192 has a similar function and will not be described again. In the embodiment, the first filter 182 and the second filter 192 are Glitch Filter.

In another embodiment, the motor driver integrated circuit 10 can include an interrupt controller 140. When the overcurrent is generated in the motor, the overcurrent comparator simultaneously outputs the overcurrent protection signal to the interrupt controller 140 and the PWM output unit 125. The interrupt controller 140 sends an interrupt signal to the CPU 115, which controls an external device, such as a display, an alarm, etc., to indicate that the motor 30 is in a fault condition based on the interrupt signal.

In the embodiment, the overcurrent comparator 180 is integrated in the motor driver integrated circuit 10, which reduces a number of electronic components used compared to the prior art and reduces an overall size of the motor control circuit. The motor driver integrated circuit can run with a low power consumption and a high reliability.

The motor device 100 according to the embodiment can also be applied to an application device, which may be one of a pump, a fan, a household appliance, a vehicle, etc. The household appliance can be a washing machine, a dishwasher, a rangehood, an exhaust fan and so on.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A motor driver integrated circuit, comprising:
a plurality of position comparators, each of the plurality of position comparators receiving a pole detection signal denoting a position of a rotor of a motor;
a timer receiving a timing interrupt signal output by the plurality of position comparators when a predetermined edge of the pole detection signal generated and recording a time of the predetermined edge;
a logic selection circuit coupled between the plurality of position comparators and the timer, the logic selection circuit selecting two adjacent edges of the pole detection signal and controlling the timer to start; and
a central processing unit obtaining a rotation speed of the motor according to a time difference between two adjacent edges selected by the logic selection circuit.

2. The motor driver integrated circuit of claim 1, wherein the logic selection circuit selects two adjacent edges of one pole detection signal, two adjacent rising edges of one pole detection signal, two adjacent falling edges of the one pole detection signal, the two adjacent edges of two pole detection signals, the two adjacent rising edges of two pole detection signals, or the two adjacent falling edge of two pole detection signals according to the setting of the central processing unit.

3. The motor driver integrated circuit of claim 1, wherein the motor driver integrated circuit comprises at least two position comparators, the central processing unit obtaining the rotation speed according to at least two pole detection signals.

4. The motor driver integrated circuit of claim 1, wherein the pole detection signal is obtained by a Hall sensor or by a back-EMF zero-crossing detection method.

5. The motor driver integrated circuit of claim 1, wherein when one of the plurality of position comparators receives the predetermined edge and outputs the timing interrupt signal to the timer, the timer records a first time; when a next predetermined edge is generated, the timer receives the timing interrupt signal and records a second time; and the central processing unit obtains the rotation speed of the motor via a time difference between the first time and the second time.

6. The motor driver integrated circuit of claim 5, wherein the first time is a time when the predetermined edge is generated for a first pole detection signal, and the second time is a time when the predetermined edge is generated for a second pole detection signal.

7. The motor driver integrated circuit of claim 5, wherein after the second time is recorded, the timer clears the first time and records the second time as the first time, when a next predetermined edge is generated, a second time is recorded.

8. The motor driver integrated circuit of claim 1, further comprising a PWM output unit; an overcurrent comparator receiving a detection signal and comparing the detection signal with a reference value; wherein when the detection signal is larger than the reference value, the PWM output unit is entered to an overcurrent protection mode under control an overcurrent protection signal output by the overcurrent comparator.

9. The motor driver integrated circuit of claim 8, wherein the overcurrent comparator directly outputs the overcurrent protection signal to the PWM output unit and controls the PWM output unit to enter the overcurrent protection mode.

10. The motor driver integrated circuit of claim 8, wherein the overcurrent comparator outputs the overcurrent protection signal to the central processing unit and the central processing unit controls the PWM output unit to enter the overcurrent protection mode.

11. The motor driver integrated circuit of claim 10, further comprising a plurality of operation amplifiers, each operation amplifier receives a current flowing through a winding, the central processing unit obtains a rotation speed according to the current.

12. The motor driver integrated circuit of claim 8, further comprising an interrupt controller, wherein the overcurrent comparator outputs the overcurrent protection signal to the interrupt controller, the interrupt controller outputs an interrupt signal to the central processing unit, and the central processing unit controls the PWM output unit enter the overcurrent protection mode.

13. The motor driver integrated circuit of claim 8, wherein when the PWM output unit is entered into the overcurrent protection mode, the PWM output unit performs one of following operations:

stopping outputting drive signal;

reducing a duty of the drive signal; and stopping outputting the drive signal and resetting to output the drive signal after a preset time delay.

14. The motor driver integrated circuit of claim 1, further comprising a shifter connected to the central processing unit via a bus.

15. A motor device, comprising a motor and a motor driver integrated circuit of claim 1.

16. An application apparatus, comprising a motor device of claim 15.

17. The application apparatus of claim 16, wherein the application apparatus is one of a pump, a fan, a household appliance, and a vehicle.

18. The motor driver integrated circuit of claim 1, further comprising a plurality of operation amplifiers, wherein the plurality of operation amplifiers simultaneously collect currents of the motor, and the central processing unit obtain the rotation speed of the motor.

19. The motor driver integrated circuit of claim 1, further comprising:

a bare die having an 8-bit microcontroller fabricated by a 0.15 μm semiconductor process, wherein the 8-bit microcontroller has a highest frequency which is larger than 50 MHz.

20. The motor driver integrated circuit of claim 1, further comprising a clock circuit outputting a system clock signal to the 8-bit microcontroller, wherein during a power-on period of the motor driver integrated circuit, a frequency of the system clock signal output by the clock circuit is one quarter of a highest frequency of the system clock signal.

* * * * *